June 7, 1932. T. R. E. RUNDQVIST 1,862,496
DRILLING MECHANISM
Original Filed Jan. 5, 1924 6 Sheets-Sheet 1

June 7, 1932.  T. R. E. RUNDQVIST  1,862,496
DRILLING MECHANISM
Original Filed Jan. 5, 1924   6 Sheets-Sheet 2

Inventor:
Thore R. E. Rundqvist.
Horace K. [signature]
atty.

June 7, 1932.    T. R. E. RUNDQVIST    1,862,496
DRILLING MECHANISM
Original Filed Jan. 5, 1924    6 Sheets-Sheet 4

Inventor:
Thore R. E. Rundqvist.
by
att'y.

Inventor:
Thore R. E. Rundqvist
by Louis A. Maxson
atty.

Patented June 7, 1932

1,862,496

UNITED STATES PATENT OFFICE

THORE R. E. RUNDQVIST, OF CLAREMONT, NEW HAMPSHIRE, ASSIGNOR TO SULLIVAN MACHINERY COMPANY, A CORPORATION OF MASSACHUSETTS

DRILLING MECHANISM

Application filed January 5, 1924, Serial No. 684,634. Renewed May 25, 1931.

My invention relates to drilling mechanisms.

An object of my invention is to provide an improved drilling mechanism. Another object of my invention is to provide an improved rock drilling mechanism of the pressure fluid percussive type having improved controlling means therefor. Still another object of my invention is to provide an improved rock drilling mechanism of the pressure fluid fed type having improved manual and automatic controlling means therefor. A further object of my invention is to provide an improved rock drilling mechanism of the pressure fluid fed mounted drifter type having improved automatic controlling mechanism for the feeding means whereby the latter is automatically controlled under certain conditions in accordance with the nature of the drilling encountered. A still further object of my invention is to provide an improved pressure fluid fed rock drilling mechanism of the mounted "drifter" type having improved controlling means whereby the feeding means is automatically controlled by means responsive to the resistance to the rotation of the drill steel and whereby the release of a stuck drill steel is automatically accomplished. Still another object of my invention is to provide improved means for "spotting" a hole, for advancing and reversing the feed, and an improved general arrangement of the machine parts. These and other objects of my invention will, however, hereinafter more fully appear.

In the accompanying drawings I have shown for purposes of illustration one form which my invention may assume in practice.

In these drawings.

Figures 1, 2, 3:
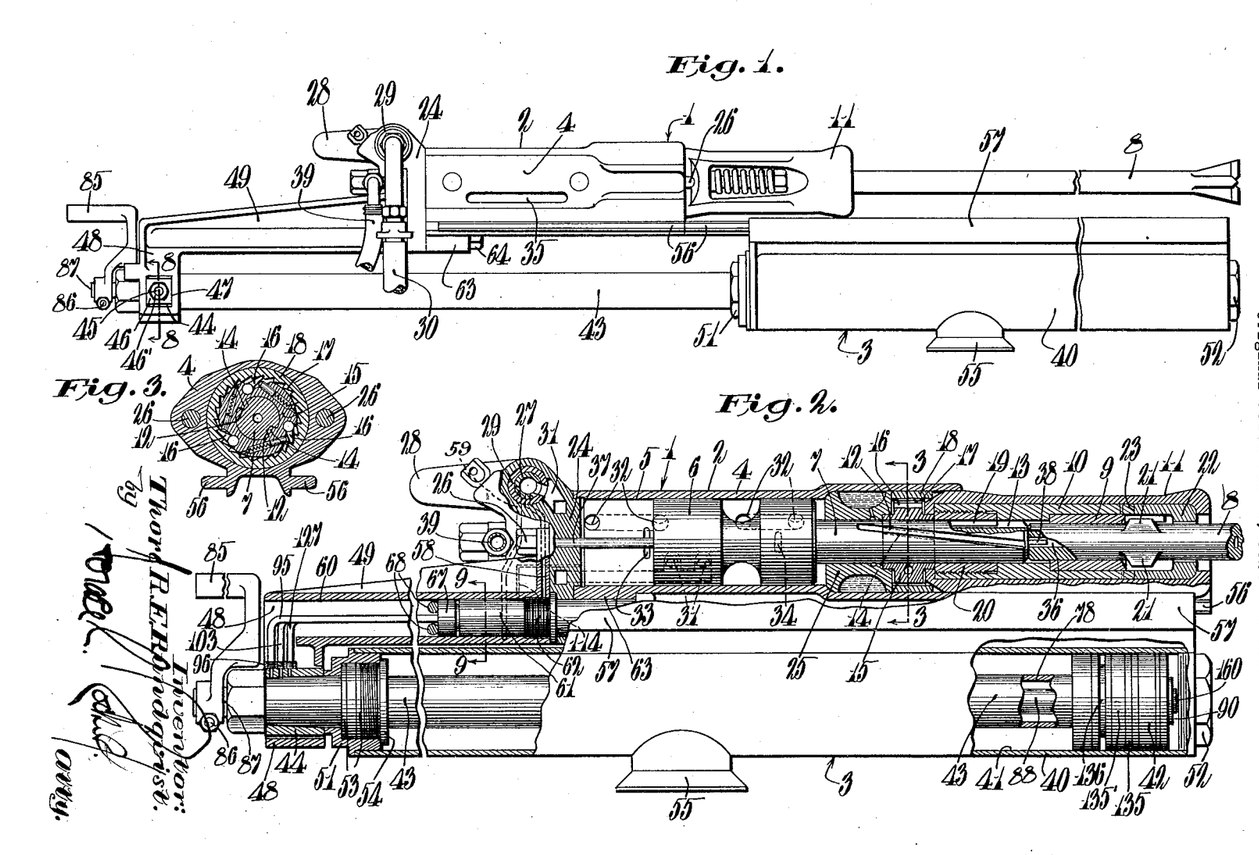
Fig. 1 is a side elevation of a mounted rock drilling mechanism of the pressure fluid fed type in which an illustrative form of my invention is incorporated.
Fig. 2 is a central longitudinal vertical sectional view of Fig. 1, the view being partially in side elevation and with parts in a different position.
Fig. 3 is a transverse sectional view taken substantially on line 3—3 of Fig. 2.

In this illustrative form of my invention I have shown a mounted "drifter" drill, generally designated 1, comprising a drilling motor 2 and a feeding mechanism 3. The drilling motor 2 is herein of the valveless pressure fluid percussive type comprising a cylinder 4 having a longitudinally extending bore 5 in which a grooved hammer piston 6 provided with a striking bar 7 is reciprocable. The striking bar of the piston 6 is adapted to percussively actuate a drill steel 8 carried in a chuck bushing 9 having a pressed fit in a bore in a chuck member 10 carried within a chuck housing 11 in a well known manner. Herein the striking bar 7 of the hammer piston 6 is provided with spiral and straight grooves or flutes 12 and 13 respectively, the former cooperating with spiral lugs or vanes 14 formed on a pawl carrier member 15 (see Fig. 3). The pawl carrier 15 is provided with a plurality of spring pressed pawls 16 which are adapted to engage ratchet teeth 17 formed on a ratchet ring 18 suitably secured within the front end of the drilling motor. The straight flutes 13 cooperate with straight lugs or vanes 19 formed on a bushing member 20 suitably threaded within the rear end of the chuck member 10. As illustrated, the drill steel 8 is provided with laterally projecting lugs 21 which are adapted to engage cooperating lugs formed on a steel locking and driving member 22 clutched at 23 to the front end of the chuck member 10 in a well known manner. Herein, it will be noted that when the piston reciprocates the pawls 16 slip over the ratchet teeth 17 during the forward piston stroke but engage the ratchet teeth during the rearward piston stroke thereby causing the piston to have a rotary movement which is transmitted to the drill steel 8. It will be observed that the ends of the cylinder bore 5 are closed by suitable head members 24 and 25, these heads and the other drilling motor parts being held in the desired assembled relation by means of side rod connections 26 in the usual manner. A suitable throttle valve 27 provided with an operating handle 28 is disposed in a valve bushing 29 suitably secured within the rear head 24 and this valve controls the admission of pressure fluid through a pipe connection 30 to the usual inlet passage of the drilling motor, which pressure fluid is alternately delivered to the opposite ends of the cylinder bore 5 by means of the usual inlet ports 31 and by-pass passages 32 controlled by the piston 6. Exhaust ports 33 and 34 alternately open the opposite ends of the cylinder to exhaust through passages or slots 35 formed in the opposite sides of the cylinder 4 and communicating with the atmosphere. Herein, it will be noted that cleansing fluids, herein air and water, are adapted to be admitted to a bore 36 formed in the drill steel 8 through suitable tubes 37 and 38, the former being connected with live air by a passage (not shown) leading from the throttle valve 27 while the latter is supplied with water through a pipe connection 39 from any suitable source of supply.

The feeding mechanism 3 comprises a feed cylinder 40 disposed parallel to the axis of the drilling motor and having a bore 41 in which a piston 42, having fluid tight packings, is disposed. A piston rod 43 is suitably rigidly secured to the piston 42 at its forward end and at its rear end by a tapered bore and nut connection to a crosshead member 44 having laterally projecting cylindrical pins 45 disposed in square blocks 46, held in position by lock nuts 46' and these blocks are vertically slidable in rectangular openings 47 formed in a depending portion 48 of a bracket member 49 formed integral with the rear drilling motor head member 24, thereby forming a self-adjusting connection between the bracket and the piston rod for maintaining the feed piston in alinement with the feed cylinder. As illustrated, the ends of the bore 41 of the feed cylinder 40 are closed by head members 51 and 52 suitably threaded therein, the former being provided with packings 53 and an adjustable nut or collar member 54 which presses the packings tightly into position, thereby preventing leakage of pressure fluid from the rear end of the feed cylinder 40. The feed cylinder 40 is provided with a plate 55 suitably welded thereto which is adapted to be clamped in the usual manner to a tripod or column (not shown). Herein, it will be observed that the drilling motor cylinder 4 and the chuck housing 11 are provided with longitudinally extending gibs 56 which cooperate with guides 57 suitably welded to the feed cylinder 40 along its entire length. Pressure fluid is adapted to be admitted to the feeding mechanism 3 under the control of the throttle valve 27 and improved controlling mechanism, to be hereinafter fully described, through supply passages 58 and 59.

Figure 6:
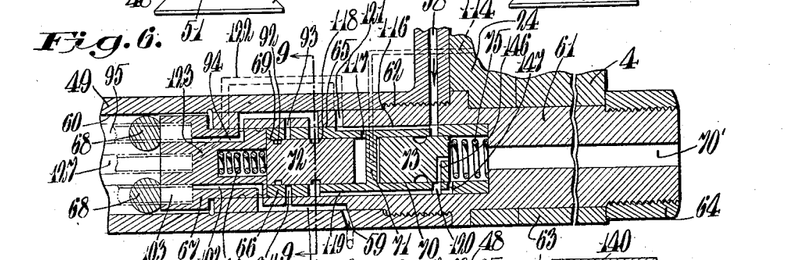
Figs. 6 and 7 are somewhat diagrammatic central longitudinal sectional views taken substantially on lines 6—6 and 7—7 of Fig. 4, the pressure fluid conducting supply tubes being shown in a vertical plane to facilitate illustration, and illustrating portions of my improved controlling mechanisms.
Figures 7, 8, 9:
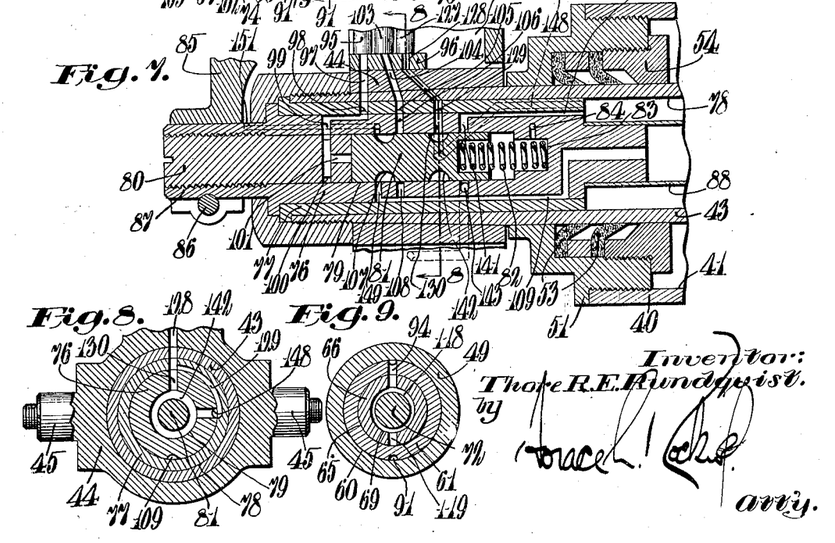
Fig. 8 is a transverse sectional view taken substantially on line 8—8 of Figs. 1 and 7, the view being partially broken away to facilitate illustration.
Fig. 9 is a transverse sectional view taken substantially on line 9—9 of Figs. 2 and 6.
Figure 13:
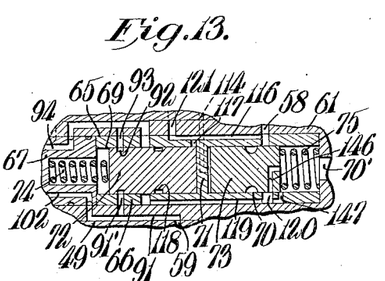
Figs. 13 and 14 are fragmentary detail sectional views similar to that shown in Fig. 6 illustrating the feed controlling valves in different positions.
Figure 15:
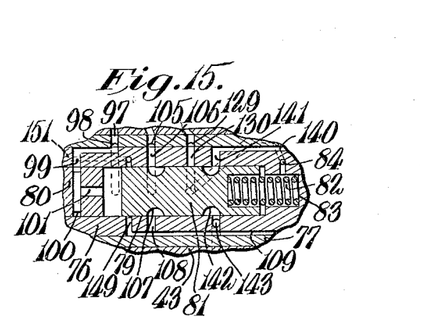
Fig. 15 is a fragmentary detail sectional view similar to Fig. 7 illustrating the automatic reversing valve in a different position.
Figure 18:
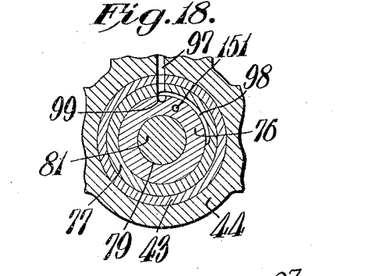
Fig. 18 is a transverse sectional view taken through the circumferentially extending groove 98 shown in Fig. 7, the view being taken on a plane substantially parallel with the plane of section line 8—8 of Fig. 7.
Figure 19:
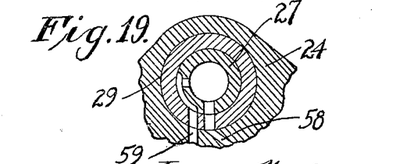
Fig. 19 is a detail sectional view illustrating the main controlling valve and the fluid supply passages for the feeding means controlled thereby.

In my improved construction it will be noted that the rearwardly extending bracket member 49 is provided with a longitudinally extending bore 60 in which a valve plug 61 is threaded at 62 and this plug is rigidly secured within a generally annular depending boss 63 formed on the rear end of the motor cylinder 4, herein by a threaded nut connection 64. Herein, the valve plug is provided with a bore 65 in which a valve bushing 66 is inserted and suitably held in position by means of a plug member 67 and transversely disposed pins 68 engaging the latter. As illustrated, the valve bushing 66 is provided with bores 69 and 70 separated by a partition or wall 71 and in which bores grooved feed controlling valves 72 and 73 are arranged and held in position by coiled springs 74 and 75 respectively, the forward end of the bore 70 being vented to the atmosphere by way of a port 70'. Herein, a valve plug 76 (see Fig. 7) is disposed in a valve bushing 77 which is held in position by a suitable nut connection within the rear end of a bore 78 formed in the piston rod 43, this housing having a bore 79 formed therein closed at its rear end by a screw plug 80 and in which bore a feed control valve 81 is disposed and held in inoperative position by a coiled spring 82 arranged in a chamber 83 which is vented to the atmosphere by means of a small port 84. A manual operating handle 85 is secured by a bolt and nut connection 86 to a projecting sleeve 87 formed on the valve plug 76, and the plug 76 has a tubular fluid conducting member 88 brazed thereto and to a valve member 89 (see Fig. 11) disposed in a valve bushing 90 suitably secured within the forward end of the piston rod 43. By swinging the handle 85, the tube 88 and consequently the valve 89 may be rotated for purposes to be hereinafter described. By manipulating the throttle valve handle 28 pressure fluid may be admitted to the passage 59 leading from the throttle valve 27 and the pressure fluid passes through passage 91, port 91', groove 92 in the valve 72, the valve being held to the right by the spring 74 at this time (see Fig. 13), port 93 and passage 94 communicating with a flexible fluid conducting tube 95 which is secured at its rear end in a plate 96 (see Fig. 7), suitably secured to the crosshead member 44, and through passage 97, a circumferentially extending groove 98 in the bushing 77 (see Fig. 18), which groove permits the valve plug 76 to be rotated relative to the bushing 77 while maintaining the ports open, the fluid flowing through passage 99, a groove 100 in the plug 80, and a port 101 communicating with the bore 79 at the rear end of the valve 81, moving the latter to the right as shown in Fig. 15. Simultaneously fluid passes from the passage 59 (see Fig. 6), passage 91, and passage 102, through a flexible fluid conducting tube 103 disposed parallel with the tube 95 and likewise secured at its rear end in the plate 96, the fluid flowing through a passage 104, a circumferentially extending groove 105 similar to the groove 98 as shown in Fig. 18, port 106, groove 107 formed in the valve 81, the valve being held to the right at this time by means of pressure fluid in the bore 79, port 108, and passage 109 to the interior of the tube 88, and through passage 110, passage 111 formed in the valve 89, and passages 112 and 113 (see Fig. 10) to the rear end of the feed cylinder bore, thereby feeding the drilling motor forward, from the position shown in Fig. 1, relative to the feed cylinder and bringing the drill steel against the work, the handle 85 controlling the valve 89 being swung in its forward feed position as shown in full lines in Fig. 4 at this time. The throttle valve handle 28 is again manipulated admitting pressure fluid from the throttle valve to the inlet ports 31 and by-pass passages 32 of the drilling motor effecting reciprocation of the hammer piston 6 and causing the drill steel to be rotated and percussively actuated thereby. Herein, it will be noted that a small passage 114 connects the rear end of the bore 5 of the drilling motor cylinder 4 with the rear end of the bore 70, formed within the bushing 66 carried by the bracket 49, causing the pressure within the drilling motor during the normal operation of the latter to hold the grooved valve 73 to the right against the tension of the spring 75. Pressure fluid now passes from the passage 58 leading from the throttle valve 27 through passages 116 and 117 to the forward end of the bore 69, moving the valve 72 to the left (see Fig. 6) against the spring 74, cutting off the passage of pressure fluid through the groove 92 in the valve 72 and opening communication by means of a groove 118 from passages 119 and 120 and the groove in the valve 73, pressure fluid passing through the passage 94 and tube 95 and passages 97 and 99 and port 101 to the bore 79, the pressure fluid in the latter holding the valve 81 over to the right as shown in Fig. 15. At the same time, pressure fluid passes from the passage 116 through passages 121, 122, and 123 to a flexible fluid conducting tube 127, passage 128, circumferentially extending groove 129 (see Fig. 8), and port 130 communicating with the bore 79, the valve 81 closing the port 130 at this time.

Figure 4:
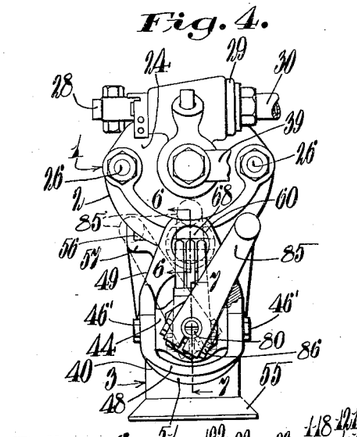
Fig. 4 is a rear end elevation of Fig. 1, the manual controlling handle being shown in a plurality of positions.
Figure 5:
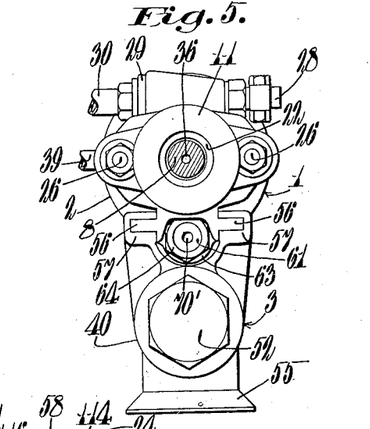
Fig. 5 is a front end elevation of Fig. 1.
Figure 12:
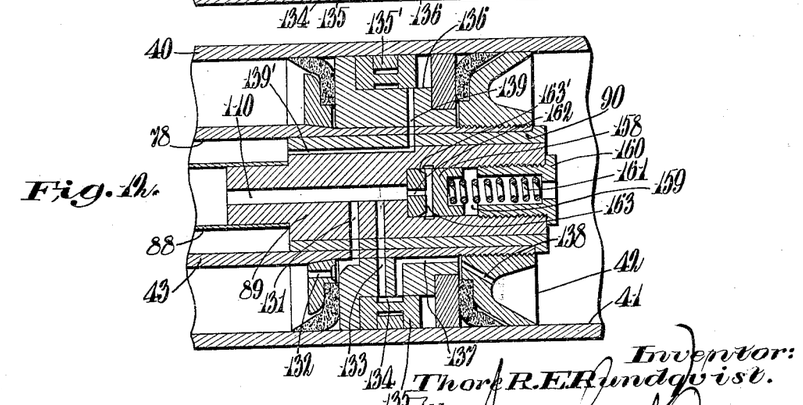

The manual control handle 85 controlling the valve 89 is now swung to its central or "spotting" position, as indicated in the first dotted line position to the left of the full line position shown in Fig. 4, rotating the valve 89 to the position shown in Fig. 12, admitting pressure fluid from the passage 110 which communicates through passages heretofore described with the passage 59 leading from the throttle valve 27 through the passage 131, and passage 132 to the rear end of the feed cylinder bore 41 while simultaneously pressure fluid passes through passage 133, annular groove 134 formed in the interior periphery of an annular valve 135 provided with a friction spring 135' which engages the walls of the cylinder bore and this valve is disposed in an annular groove 136 formed in the feed piston 42. Pressure fluid then flows through passages 137 and 138 to the front end of the feed cylinder bore 41.

The area of the front end of piston 42 being greater than the area of the rear end thereof causes the drilling motor to move slightly rearward until the slide valve 135, which tends to stay stationary with the cylinder, engages the forward end of the groove 136 causing the passage 133 to be cut off and the groove 134 (see Fig. 17) connects the passages 138, 137 to exhaust through passages 139 and 139' the annular bore 78 in the piston rod, passage 140 and port 141, (see Fig. 15), groove 142 in the valve 81, said valve being at the right of that figure at this time, and passage 143 leading to the atmosphere. This causes the drilling motor again to move forward, the pressure acting on the smaller area of the piston being constant, this operation being repeated, slightly moving the drill back and forth, until the hole is "spotted". After the "spotting" of the hole is completed the handle 85 controlling the valve 89 is moved to the full line position shown in Fig. 4, consequently causing the pressure fluid to again pass from the tube 88, passages 110, (see Fig. 10), 111, 112, and 113 to the rear end of the feed cylinder bore while the pressure fluid in the front end of the cylinder is exhausted through passages 144, 145, the bore 78 in the piston rod 43, passage 140, (see Fig. 7) port 141, groove 142 in the valve 81, and passage 143 to the atmosphere.

Figure 10:
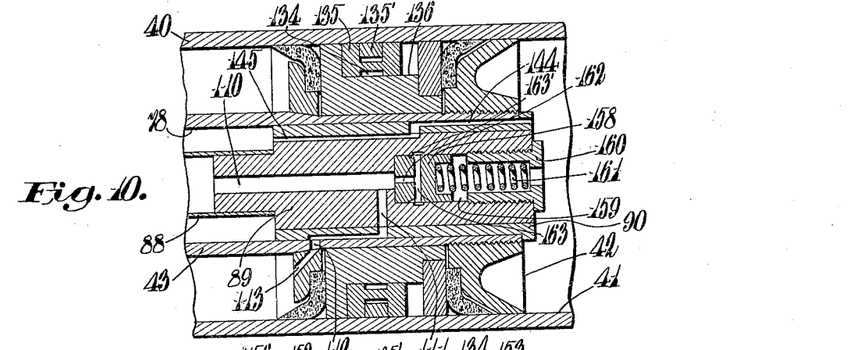
Fig. 10 is a sectional view of the feed piston shown in Fig. 2.
Figure 11:
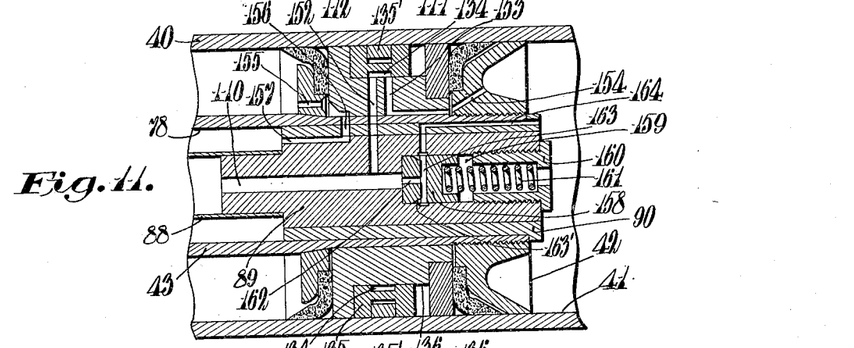
Figs. 11 and 12 are sectional views similar to Fig. 10 but taken on different diametrical planes.
Figure 16:
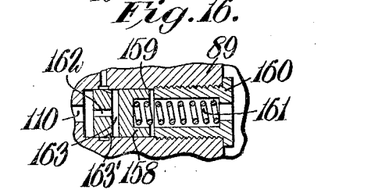
Fig. 16 is a fragmentary sectional view illustrating the speed control valve 158 shown in Figs. 10 to 12 in a different position.

If soft drilling is encountered which sticks the drill steel, preventing rotation and consequently rearward movement of the hammer piston 6, (see Fig. 2) the pressure in the rear end of the cylinder bore 5 is exhausted to atmosphere through ports 33, and passages 35, and consequently exhausts the pressure in the port 114 leading to the bore 70 (see Fig. 6) causing the spring 75 to move the valve 73 to the left, cutting off the pressure fluid supply to the tube 95 and simultaneously the pressure fluid in the bore 79 formed in the valve plug 76 carried within the rear end of the piston rod 43 (see Fig. 7) is exhausted through the port 101, passages 99, 97, tube 95, passage 94, groove 118 in the valve 72, passage 119, port 120, through passages 146 and 147 communicating with the port 70' leading to the atmosphere. The pressure fluid in the tube 127 which communicates through passages heretofore described with the pasage 58 leading from the throttle valve 27 then passes through the groove 142 in the valve 81, passage 148 communicating with the bore 78 of the piston rod 43, and passages 145 and 144 as shown in Fig. 10, the passages 157, 152, 164, 139, 131 and 133 shown in Figs. 11 and 12 being closed at this time by means of the valve 89 causing the pressure to act on the large surface of the piston 42 moving it rapidly rearward while the pressure fluid in the rear end of the cylinder bore 41 acting on the small area of the piston is exhausted through passages 113, 112, 111, 110, the interior of the tube 88, passage 109 (see Fig. 7), port 149, groove 107 in the valve 81, and passage 151 leading to the atmosphere. This operation causes the stuck drill steel to be released and when the steel is again free to rotate, pressure builds up in the cylinder of the drilling motor and is automatically admitted to the rear end of the feed cylinder bore through passage 59, passage 91, passage 102, tube 103, passage 104, groove 105, port 106, groove 107 in the valve 81, port 108, passage 109, through the tube 88, passage 110 at the forward end of the tube 88, and passages 111, 112, and 113, while the front end of the feed cylinder bore is opened to exhaust through passages 144, 145, formed within the piston 42, bore 78 in the piston rod 43, passages 140, 141 formed adjacent the rear end of the piston rod 43, groove 142 in the valve 81, and the passage 143 communicating with the atmosphere, the drill feeding forward with the motor running. At the end of the forward feed of the drill the handle 85 controlling the valve 89 is swung over to the left, as indicated in the left hand dotted line position shown in Fig. 4, rotating the valve 89 to the position shown in Fig. 11, admitting live pressure fluid from the passages 110 through passage 152, groove 134 in the slide valve 135, passages 153 and 154 to the front end of the feed cylinder bore 41 while the rear end of the feed cylinder is simultaneously exhausted through passages 155, 156 and 157, bore 78 in the piston rod 43, passage 140, (see Fig. 15) port 141, groove 142 in the valve 81, and passage 143 leading to the atmosphere. This operation causes the feed piston 42 to move rapidly rearward while the spring 135', frictionally engaging the walls of the feed cylinder bore 41, holds the slide valve 135 stationary with the feed cylinder until the forward shoulder of the groove 136 engages the valve causing the same and the feed piston to move simultaneously and cutting off the pressure fluid supply through the annular groove 134 and the ports 153, 154. At this time the pressure in the passage 110 is greater than the pressure in the front end of the feed cylinder bore 41 due to the increase of the volumetric capacity of the latter caused by movement of the feed piston so the pressure acting on the left hand end of a valve 158, disposed in a bore 159 closed by a threaded apertured plug 160, causes it to move to the right against the pressure of a spring 161 (see Fig. 17). This substantially cuts down the supply of pressure fluid through passages 162 and 163 in the valve, as shown in Fig. 16 the pressure fluid now leaking through slots 163' to the passage 164 in the valve bushing 90 communicating with the feed cylinder. As the pressure fluid passing through the slots 163' builds up a pressure in the front end of the feed cylinder bore 41, it causes the valve 158 to move to the left, completely opening communication through the passages 162, 163 and 164 feeding the drill rearward. If the rearward movement of the feed piston 42 is again excessive the pressure drops in the feed cylinder bore and the valve 158 moves to the right reducing the supply of pressure fluid through the passage 164.

In the operation of my invention it will be noted that the rock drilling mechanism is mounted on a tripod or column a suitable distance from the working face. The operator then grasps the handle 85 and moves the valves 76 and 89 to the position shown in Figs. 10 and 15. The operator then grasps the handle 28 controlling the throttle valve 27 and moves the latter into a position to admit pressure fluid to the passage 59, it being understood that the passage 58 and the motor supply passage are closed at that time. Pressure fluid then flows through passage 59, passage 91, port 91', groove 92 in the valve 72, (the latter being held in the position shown in Fig. 13 at that time) through port 93, passage 94, tube 95, passages 97 and 99, and port 101 to the bore 79 at the rear end of the feed control valve 81, and as a result the latter is moved to the position shown in Fig. 15. Pressure fluid then flows from passage 59 through passages 91 and 102, port 106, through the groove 107 in the valve 81, port 108, passage 109, through the tube 88, and passages 110, 111, 112, and 113 to the end of the feed cylinder 40 at the rear side of the feed piston 42 thereby moving the latter forwardly. At this time the end of the feed cylinder at the front side of the feed piston is vented to atmosphere through passages 144 and 145, through the hollow piston rod 43, passage 140, groove 142 in the valve 81, and passage 143. As a result the drilling motor is fed forwardly until the drill steel engages the work.

Figure 14:
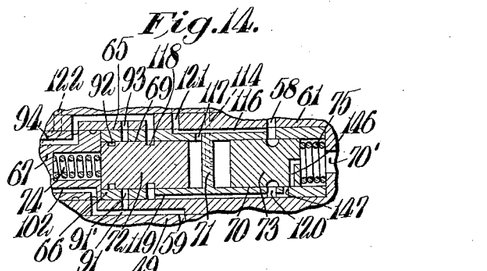
Figure 17:
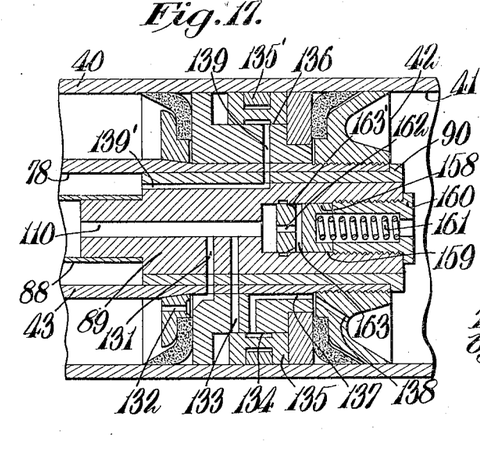
Fig. 17 is a sectional view similar to that shown in Fig. 12 illustrating the slide valve 135 and the speed control valve 158 in different positions.
Figure 21:
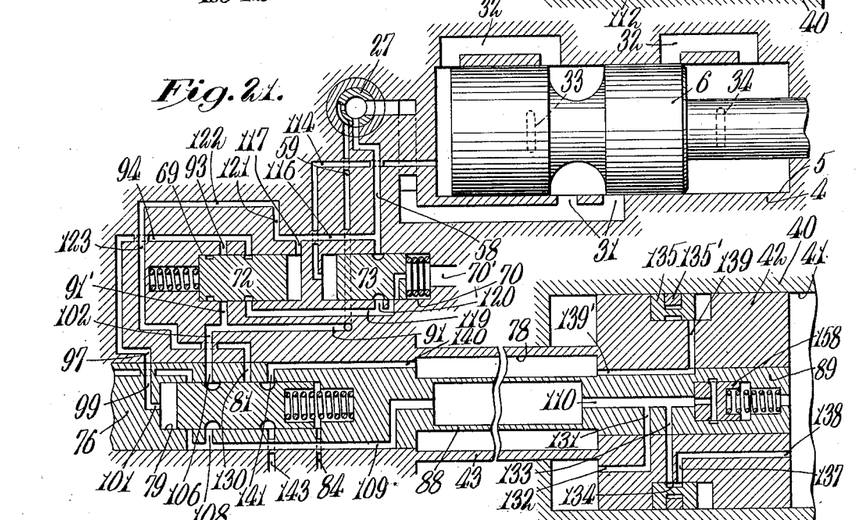
Fig. 21 is a similar view illustrating the parts in a position to effect the "spotting" operation.

After the drilling motor is suitably positioned with the drill steel against the work, the operator moves the valves 76 and 89 to their "spotting" position as shown in Figs. 12 and 21. The throttle valve 27 is then turned to the position shown in Fig. 21 and pressure fluid is admitted from the throttle valve 27 to the supply passages 31, 32 of the drilling motor thereby effecting reciprocation of the hammer piston, and as a result the drill steel is percussively actuated. During running of the drilling motor the feed control valve 73 is held, as shown in Figs. 14 and 21, in its forward position, by the pressure within the passage 114 connecting the rear end of the motor cylinder with the bore 70 at the rear end of the valve 73. Pressure fluid also flows at this time through passage 58, past the valve 73, through passage 119, past the feed control valve 72, through passage 94, tube 95, passages 97 and 99, and port 101 to the bore 79 at the rear end of the feed control valve 81 thereby moving the latter to the position shown in Figs. 15 and 21. With the valve 81 in the position shown, pressure fluid flows from the throttle valve 27 through passage 59, passages 91 and 102, port 106, past the valve 81, through port 108, passage 109, through the tube 88, and passages 110, 131, and 132 to the end of the feed cylinder 40 at the rear side of the feed piston 42, the flow of pressure fluid to the rear end of the feed cylinder being constant during the "spotting" operation. Pressure fluid also flows, when the valve 135 is in the position shown in Figs. 12 and 21, through passage 133, groove 134 in the "spotting" valve 135, and passages 137 and 138 to the front end of the feed cylinder at the forward side of the feed piston 42. As the pressure area at the front side of the feed piston 42 is substantially larger than the pressure area at the rear side of the piston, the latter together with the drilling motor is moved rearwardly. As the feed piston 42 moves rearwardly, the "spotting" valve 135 is held stationary and as a result the supply of pressure fluid to the front end of the feed cylinder is cut off and is vented to atmosphere as shown in Fig. 17 through passages 138, 137, the groove 134 in the valve 135, passages 139 and 139', through the hollow piston rod 43, passages 140, past the valve 81, and through exhaust passage 143 as clearly shown in Fig. 21. Since the flow of pressure fluid to the forward end of the feed cylinder at the rear side of the feed piston is constant, the feed piston together with the drilling motor is moved forwardly until the valve 135 again assumes the position shown in Fig. 21 and the feed is then again automatically reversed, this operation being repeated, moving the drilling motor slightly back and forth, until the hole is "spotted".

Figure 20:
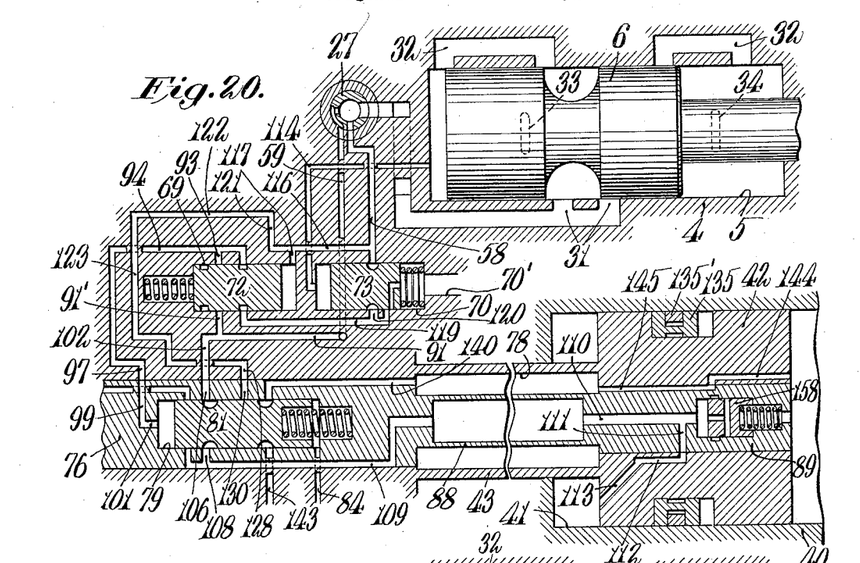
Fig. 20 is a diagrammatic view illustrating the parts in a position to effect the normal forward feeding operation with the drilling motor running.

After the completion of the "spotting" operation the valves 76 and 89 are moved to the position shown in Figs. 10 and 20, it being understood that the drilling motor is still running and the feed control valves 72, 73, and 81 are still pneumatically held in the positions shown in Fig. 21. Pressure fluid then flows from the throttle valve 27 through passage 59, passages 91 and 102, past the feed control valve 81, through the port 108 and passage 109, the tube 88 and passages 110, 111, 112, and 113 to the end of the feed cylinder at the rear side of the feed piston 42. The forward end of the feed cylinder at the front side of the feed piston is at that time opened to atmosphere through passages 144 and 145, the hollow piston rod 43 and passages 140 and 143. As a result the drill is fed forwardly with the drilling motor running.

Figure 22:
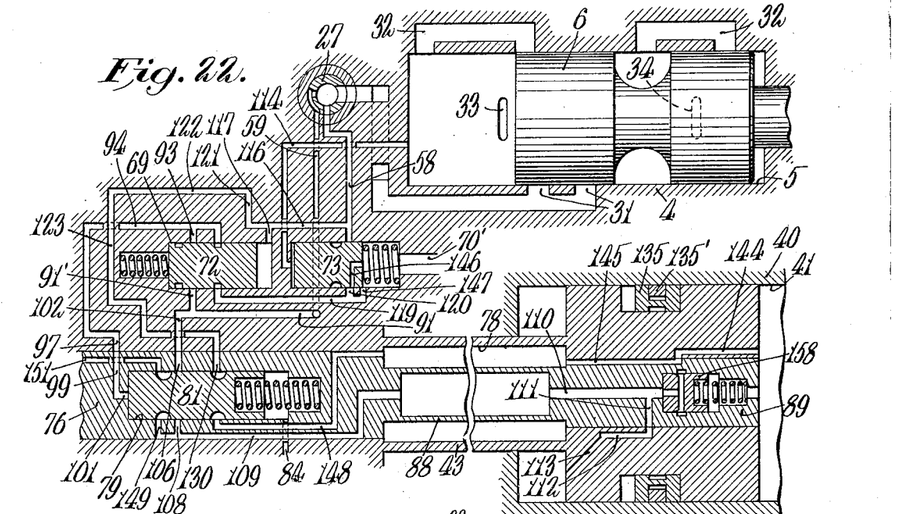
Fig. 22 is a view similar to Fig. 20 illustrating the parts in a position to effect automatic reversal of the feed to release a stuck drill steel.

If soft drilling is encountered which sticks the drill steel preventing rotation thereof, i. e., when the resistance to drill steel rotation becomes too great, rearward movement of the hammer piston 6 is prevented by the ratchet and pawl mechanism 16, 17, the hammer piston 6 being held in the position shown in Fig. 22 at that time. The pressure fluid within the rear end of the motor cylinder is exhausted to atmosphere through exhaust passage 33 and as a result the pressure in the bore 70 at the rearward end of the valve 73 is vented to atmosphere and the valve 73 moved to the position shown in Figs. 13 and 22 by the coiled spring 75. At this time the bore 79 at the rear end of the valve 81 is vented to atmosphere through port 101, passages 99, 97, tube 95, passage 94, past the valve 72, passage 119, ports 102 and 147, passage 146 in the valve 73 and the vent passage 70' leading directly to atmosphere, the valve 81 being held at that time in the position shown in Fig. 22 by the coiled spring 82. Pressure fluid then flows from the throttle valve 27 through passage 58, passages 116, 121, 122, 123, through tube 127, port 130, past the valve 81, through passage 148, through the hollow piston rod 43, and through passages 145 and 144 to the end of the feed cylinder 40 at the front side of the feed piston 42. Simultaneously the end of the feed cylinder at the rear side of the feed piston is exhausted to atmosphere through passages 113, 112, 111, and 110, the tube 88, passage 109, port 149, and vent passage 151. As a result the pressure acting on the large forward pressure area of the feed piston causes a relatively large rearward feeding force to be imparted to the drill steel tending to free the latter. After the stuck drill steel is released and is again free to rotate, the hammer piston 6 is released and the pressure again builds up within the ends of the motor cylinder 4, the feed control valves 72, 73, and 81 again assuming the position shown in Fig. 20 and the drill is again fed forwardly with the motor running.

Figure 23:
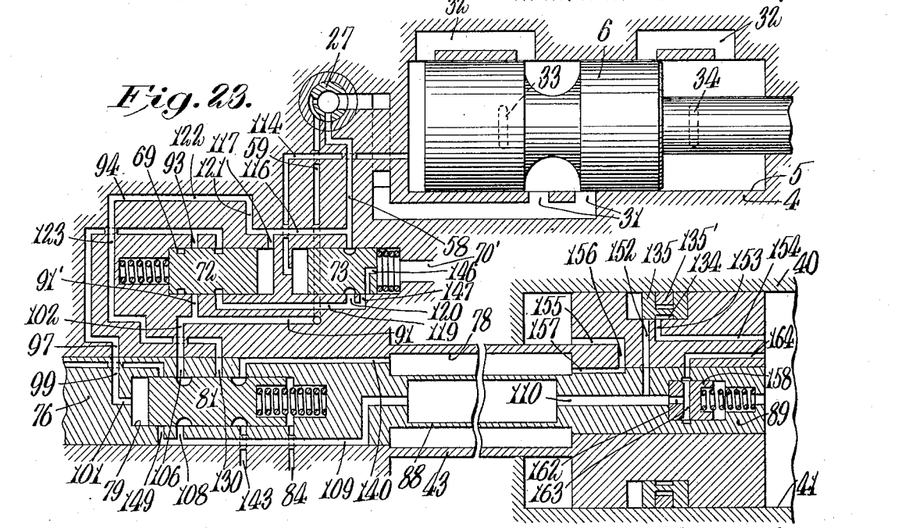
Fig. 23 is a diagrammatic view illustrating the parts in a position to effect the normal reverse feeding operation.

At the end of the forward feed the valves 76 and 89 are moved to the position shown in Fig. 23. Pressure fluid then flows from the passage 59 through passages 91 and 102, port 106, past the feed control valve 81, through port 108 and passage 109, through the tube 88, through passage 110, through passage 152 (the valve 135 being in the position shown in Fig. 11 at that time) through the groove 134 in valve 135, and through passages 153 and 154 to the end of the cylinder bore at the forward side of the feed piston 42. Simultaneously the end of the feed cylinder at the rear side of the feed piston is vented to atmosphere through passages 155, 156, 157, the hollow piston rod 43, passage 140, past the valve 81, and through passage 143 leading directly to atmosphere. Upon initial rearward movement of the feed piston the valve 135 remains stationary until the parts assume the position shown in Fig. 23. Pressure fluid then flows to the end of the feed cylinder at the forward side of the feed piston through passage 110, passage 162, 163, in the valve 158, and through passage 164, the automatic pressure control valve 158 being held at that time in the position shown in Fig. 23 by the pressure at the forward side of the feed piston. The pressure control valve 158 automatically prevents an excessive rate of rearward feed, the valve 158 intermittently opening and closing the communication between the forward end of the cylinder bore at the forward side of the feed piston and the fluid supply.

As a result of my invention it will be noted that an improved drilling mechanism is provided having improved automatic means controlled by variations in pressure within the drilling motor for releasing a drill steel as the latter is becoming stuck, consequently preventing a stuck steel and the consequent loss of a hole and automatic means for preventing an excessive rate of rearward feed. It will further be noted that improved means are provided for causing a forward and rearward feed of the drill and for "spotting" the hole. These and other advantages of my invention will, however, be clearly apparent to those skilled in the art.

While I have in this application specifically described one form which my invention may assume in practice, it will be understood that this form of the same has been shown for purposes of illustration and that the invention may be modified and embodied in various other forms without departing from its spirit or the scope of the appended claims.

What I claim as new and desire to secure by Letters Patent is:

1. In a drilling mechanism, a pressure fluid drilling motor including a hammer piston, a drill steel actuated thereby, rotation means for said steel operated by said piston, reversible positive feeding means for said drill steel comprising a single reversible motor, and means controlled by resistance to rotation of said drill steel for automatically reversing said feeding means.

2. In a drilling mechanism, a drilling motor of the hammer type, means for rotating a drill steel, pressure fluid actuated means for feeding the drill steel, and automatic pressure fluid operated means controlled by resistance to rotation of the drill steel for automatically varying the operation of said feeding means, said automatic means including a plurality of pressure fluid controlled valves for controlling fluid flow to said feeding means.

3. In a drilling mechanism, a drilling motor of the hammer type, a drill steel actuated thereby, means for rotating said drill steel, reversible fluid actuated means for positively feeding said drill steel, and pressure fluid operated means automatically controlled by resistance to drill steel rotation for reversing said feeding means, said automatic means including a plurality of pressure fluid actuated valves for controlling fluid flow to said feeding means.

4. In a drilling mechanism, a drilling motor of the hammer type, a drill steel actuated thereby, means for rotating said drill steel, reversible fluid actuated means for positively feeding said drill steel, and pressure fluid operated means automatically controlled by resistance to drill steel rotation for reversing said feeding means, said automatic means including a plurality of pressure fluid actuated valves for controlling fluid flow to said feeding means, the operation of one of said valves being dependent upon the other valve.

5. In a drilling mechanism, a drilling motor, a drill steel actuated thereby, rotation means for said steel, reversible feeding means for said motor and steel comprising a single reversible motor, and combined manual and automatic means for positively reversing said feeding means, said automatic means being operative to reverse said feeding means only when said drill steel sticks.

6. In a drilling mechanism, a drilling motor including a piston, a drill steel actuated thereby, rotation means for said steel operated by said piston, means for positively feeding said drill steel in opposite directions comprising a single reversible motor, and means for automatically reversing the direction of feed when the drill steel sticks.

7. In a drilling mechanism, a drilling motor, pressure fluid feeding means therefor including a feed cylinder and feed piston, means for admitting constant pressure to act on one side of said piston, and automatic means controlled by movement of said feed piston for variably supplying pressure to act on the other side of said piston for maintaining said piston in a substantially balanced condition.

8. In a drilling mechanism, a drilling motor, pressure fluid feeding means therefor including a cylinder and piston, and automatic means for controlling said feeding means including means for controlling the pressure acting on the feed piston for maintaining said piston in a substantially balanced condition, said controlling means including means for automatically connecting one end of said feed cylinder alternatively to supply and exhaust.

9. In a drilling mechanism, a drilling motor, a drill steel actuated thereby, rotation means for said steel including a ratchet and pawl mechanism operated by said drilling motor, fluid actuated means for feeding the drill steel, and means controlled by resistance to rotation of said drill steel for controlling said feeding means, said resistance controlled means including a pressure fluid controlled valve for controlling fluid flow to said feeding means.

10. In a drilling mechanism, a pressure fluid percussive drilling motor having pressure variations therein and including a reciprocable hammer piston and a ratchet and pawl mechanism operated thereby for rotating a drill steel, fluid pressure means for feeding the drill steel, and means controlled by variations in pressure within said drilling motor caused by resistance to drill steel rotation for automatically varying the operation of said feeding means.

11. In a drilling mechanism, a drilling motor, feeding means therefor including cooperating elements, and means including a self-adjusting connection for connecting one of said elements to said drilling motor for maintaining said feeding elements in alinement.

12. In a drilling mechanism, a drilling motor of the drifter type, a drill steel actuated by said motor, a mounting therefor including a cradle for guiding said motor, rotation means for said drill steel, reversible feeding means for said motor and steel comprising a single reversible motor, and means controlled by said drilling motor for automatically positively reversing said feeding means when said drill steel sticks.

13. In a drilling mechanism, a drilling motor, a drill steel actuated thereby, means comprising a single reversible motor for positively feeding said steel forwardly and rearwardly, and means controlled by load changes on said motor for automatically cutting out the operation of said forward feeding means and effecting operation of said rearward feeding means.

14. In a drilling mechanism, a pressure fluid actuated drilling motor having pressure variations therein and including a cylinder and a piston reciprocable therein, a drill steel actuated thereby, rotation means for said steel comprising a ratchet and pawl mechanism cooperating with said piston, feeding means for said steel, and pressure fluid operated means automatically controlled by resistance to drill steel rotation for varying the operation of said feeding means, said automatic means having an operative pressure fluid connection with said motor.

15. In a drilling mechanism, a drilling motor including a cylinder and a piston reciprocable therein, a drill steel actuated thereby, operative devices cooperating with said piston for automatically rotating said drill steel, means for positively feeding the drill steel forwardly and rearwardly comprising a single reversible motor, and means automatically controlled by resistance to steel rotation for reversing said feeding means.

16. In a drilling mechanism, a drilling motor, a drill steel actuated thereby, rotation means for said steel, means for positively feeding said steel forwardly and rearwardly comprising a single reversible motor, and means comprising a controlling member automatically controlled by resistance to drill steel rotation for reversing said feeding means.

17. In a drilling mechanism, a drilling motor including a casing, feeding means therefor including a cylinder and piston, said piston having a piston rod, and a self-adjusting connection between said casing and said rod for maintaining the feed piston in alinement with said cylinder.

18. In a drilling mechanism, a drilling motor having a casing, a rearwardly projecting bracket secured thereto, feeding means for said motor including a cylinder and piston, said piston having a rearwardly extending piston rod, and a self-adjusting connection between said bracket and the rear end of said rod for maintaining the feed piston in alinement with said cylinder.

19. In a drilling mechanism, a drilling motor having a casing, a rearwardly projecting bracket secured thereto, feeding means for said motor including a cylinder and piston, said piston having a rearwardly extending piston rod, and a self-adjusting connection between said bracket and the rear end of said rod for maintaining said feed piston and cylinder in alinement, said connection including guideways formed in said bracket, and bearing blocks slidably mounted in said guideways and carried by said rod.

20. In a fluid actuated feeding mechanism, cooperating feed cylinder and feed piston members adapted to have relative movement, means for supplying fluid constantly to act on one side of said piston, and fluid transmitting means for variably supplying fluid to act on the other side of said piston including an element movable with one of said members, and a cooperating controlling element frictionally engageable with said other member.

21. In a fluid actuated feeding mechanism, cooperating relatively movable feed cylinder and piston members, said piston having differential opposed pressure areas, means for supplying fluid constantly to one of said areas, and means for variably supplying fluid to the other area including a fluid transmitting element carried by one of said members, and a cooperating fluid controlling element engageable with said other member.

22. In a fluid actuated feeding mechanism, cooperating relatively movable feed cylinder and feed piston members, means for supplying fluid constantly to act on one side of said piston, and means for variably supplying fluid to act on the other side of said piston including a fluid transmitting element carried by one of said members and a cooperating fluid controlling element engageable with said other member.

23. In a fluid actuated feeding mechanism, cooperating relatively movable feed cylinder and piston members, means for supplying fluid constantly to act on one side of said piston, and means for variably supplying fluid to act on the other side of said piston including an element carried by one of said members and a cooperating controlling element engageable with said other member.

24. In a fluid actuated feeding mechanism, relatively movable feeding members, means for supplying fluid constantly to act on one of said feeding members, and means for controlling the flow of fluid to act on the other side of said latter member including an element movable with one of said members, and a cooperating controlling element engageable with said other member.

25. In a drilling mechanism, a drilling motor, fluid actuated feeding means therefor including relatively movable cylinder and piston members, means for supplying fluid constantly to one side of said piston, and means for variably supplying fluid to the opposite side of said piston comprising means carried by said piston and operative upon movement of the latter in opposite directions.

26. In a rock drilling apparatus, a hammering motor including a cylinder and piston, a drill steel actuated by said motor, mechanism cooperating with said piston to rotate said steel upon movement of said piston in one direction during hammering action, pressure fluid distribution means effective to exhaust one end of the cylinder when said drill steel sticks and the piston is held against reciprocation, feeding means for said motor and steel, and means responsive to pressure in said end of the cylinder for controlling said feeding means.

27. In a rock drilling apparatus, a hammering motor including a cylinder and piston, a drill steel actuated by said motor, mechanism cooperating with said piston to rotate said steel upon movement of said piston in one direction during hammering action, pressure fluid distribution means effective to exhaust one end of the cylinder when said drill steel sticks and the piston is held against reciprocation, feeding means for said motor and steel, and means responsive to pressure in said end of the cylinder for effecting reversal of said feeding means when said drill steel sticks.

28. In a drilling mechanism, a fluid actuated drilling motor, a drill steel actuated thereby, rotation means for said steel, reversible feeding means for said motor and steel, and pressure fluid operated means controlled by pressure changes in said drilling motor and operative when rotation of said drill steel is prevented for automatically reversing said feeding means.

29. In a drilling mechanism, a fluid actuated drilling motor including a cylinder and a piston reciprocable therein, a drill steel actuated by said piston, rotation mechanism for said drill steel operated by said piston, reversible feeding means for said drill steel and pressure fluid operated means controlled by the pressure in said drilling motor and operative when movement of the piston is prevented by said rotation means due to the sticking of the drill steel for automatically reversing said feeding means.

30. In a drilling mechanism, a drilling motor, fluid actuated feeding means therefor including a feed cylinder and a piston reciprocable therein, and automatic means for controlling said feeding means to maintain the latter in a substantially balanced condition including means for automatically supplying fluid intermittently to one end of said feed cylinder to act on one side of said feed piston and continuously to the other end of said feed cylinder to act on the other side of said feed piston.

31. In a drilling mechanism, a pressure fluid actuated drilling motor comprising a cylinder having a bore, a piston reciprocable in said bore and fluid distribution means for effecting reciprocation of said piston, power operated feeding means for said motor, and means for automatically controlling said feeding means including a fluid actuated controlling member movable into different controlling positions and passage means communicating with said cylinder bore for controlling said controlling member.

32. In a drilling mechanism, a pressure fluid actuated percussive drilling motor comprising a cylinder having a bore, a piston reciprocable in said bore and fluid distribution means for effecting reciprocation of said piston, pressure fluid actuated feeding means for said motor, and means for automatically controlling the flow of pressure fluid to said feeding means to control the feeding pressure including a fluid actuated controlling member movable into different controlling positions and passage means communicating with said cylinder bore for controlling said controlling member.

33. In a drilling mechanism, a pressure fluid actuated drilling motor comprising a cylinder having a bore, a piston reciprocable in said bore and fluid distribution means for effecting reciprocation of said piston, pressure fluid actuated feeding means for said motor, and means for automatically controlling the flow of pressure fluid to said feeding means comprising a fluid actuated controlling member movable into different controlling positions and passage means communicating with said cylinder bore for subjecting a portion of said member to the pressure in said motor.

34. In a drilling mechanism, a pressure fluid actuated drilling motor comprising a cylinder having a bore, a piston reciprocable in said bore and fluid distribution means for effecting reciprocation of said piston, power operated feeding means for said motor, and means for automatically controlling said feeding means to vary the operation of the latter including a valve device movable into different control-effecting positions, fluid actuated operating means for said valve device, and means for subjecting said operating means to the pressure in said drilling motor.

35. In a drilling mechanism, a pressure fluid actuated drilling motor comprising a cylinder having a bore, a piston reciprocable in said bore and fluid distribution means for effecting reciprocation of said piston, power operated feeding means for said motor, and means for automatically controlling said feeding means including a fluid actuated controlling valve movable into different controlling positions and passage means communicating with said cylinder bore for subjecting said valve to the pressure in said motor.

36. In a drilling mechanism, a pressure fluid actuated drilling motor comprising a cylinder having a bore, a piston reciprocable in said bore and fluid distribution means for effecting reciprocation of said piston, reversible power operated feeding means for feeding said motor forwardly and rearwardly, and means controlled by the pressure in said motor for automatically reversing said feeding means comprising a fluid actuated controlling member movable into different controlling positions and passage means communicating with said cylinder bore for subjecting said controlling member to the pressure in said motor cylinder.

37. In a drilling mechanism, a pressure fluid actuated drilling motor comprising a cylinder having a bore, a piston reciprocable in said bore and fluid distribution means for effecting reciprocation of said piston, reversible power operated feeding means for feeding said motor forwardly and rearwardly, and means for automatically controlling said feeding means comprising a shiftable controlling member for simultaneously controlling both said forward and reverse feeding means and passage means communicating with said cylinder bore for subjecting said controlling member to the pressure in said motor cylinder.

38. In a drilling mechanism, a pressure fluid actuated drilling motor comprising a cylinder having a bore, a piston reciprocable in said bore and fluid distribution means for effecting reciprocation of said piston, pressure fluid actuated feeding means for said motor, and means for automatically controlling said feeding means comprising a fluid actuated valve member for controlling the feeding pressure and passage means communicating with said cylinder bore for subjecting a portion of said valve member to the pressure in said motor cylinder.

39. In a drilling mechanism, a pressure fluid actuated drilling motor having pressure variations therein during normal operation thereof, power operated feeding means for said motor, and means for automatically controlling said feeding means comprising a fluid actuated controlling member movable into different control-effecting positions and controlled by pressure variations in said motor during abnormal operation of the latter, fluid actuated operating means for said controlling member, and means for subjecting said operating means to the pressure in said drilling motor.

40. In a drilling mechanism, a pressure fluid actuated drilling motor having pressure variations therein which occur rapidly during normal operation of said motor, power operated feeding means for said motor, and means for automatically controlling said feeding means comprising a control valve device movable into different control-effecting positions and actuated to control said feeding means when the pressure variations in said motor become less rapid due to abnormal operation of said motor, fluid actuated operating means for said device, and means for subjecting the said operating means to the pressure in said drilling motor.

41. In a drilling mechanism, a pressure fluid actuated drilling motor having pressure fluctuations therein of varying intensity within a certain limit during normal operation of said motor, power operated feeding means for said motor, and means for automatically controlling said feeding means comprising a fluid actuated controlling member movable into different control-effecting positions and actuated to control automatically said feeding means when the pressure fluctuations become of an intensity outside of said limit, fluid actuated operating means for said controlling member, and means for subjecting said operating means to the pressure in said drilling motor.

42. A drilling mechanism comprising a pressure fluid actuated drilling motor of the reciprocatory type, a drill steel actuated by said motor, power operated feeding means for said motor, and means for automatically controlling said feeding means including pressure fluid operated control means automatically controlled by pressure changes in said motor caused by load changes on said motor, fluid actuated operating means for said control means, and means for subjecting said operating means to the pressure in said drilling motor.

43. A drilling mechanism comprising a drilling motor of the reciprocatory type, a drill steel actuated by said motor, reverse and forward positive power operated feeding means for said motor, and means for automatically controlling both of said feeding means including control means automatically controlled by load changes on said motor within predetermined limits, power operated operating means for said control means, and means for subjecting said operating means to the action of the power medium within said drilling motor.

44. A drilling mechanism comprising a drilling motor of the reciprocatory type, a drill steel actuated by said motor, reverse and forward positive power operated feeding means for said motor, and means for automatically reversing said feeding means including control means automatically responsive to load changes on said motor within certain predetermined limits, power operated operating means for said control means, and means for subjecting said operating means to the action of the power medium within said drilling motor.

45. A drilling mechanism comprising a pressure fluid actuated drilling motor having means for automatically controlling the fluid distribution thereto, a drill steel actuated by said motor, power operated feeding means for said motor, and means for automatically controlling the pressure in said feeding means including pressure fluid operated and controlled means automatically controlled by pressure changes in said motor caused by load changes on said motor, pressure fluid actuated operating means therefor, and means for subjecting said operating means to the pressure within said drilling motor.

46. A drilling mechanism comprising a pressure fluid actuated drilling motor of the hammer type, a drill steel actuated thereby, power operated feeding means for said motor, rotation means for said steel, and means for automatically controlling said feeding means including pressure fluid operated control means automatically controlled by pressure changes in said motor caused by resistance to drill steel rotation, fluid actuated operating means for said control means, and means for subjecting said operating means to the pressure within said drilling motor.

47. A drilling mechanism comprising a pressure fluid actuated drilling motor having pressure variations therein during operation thereof, a drill steel actuated by said motor, rotation means for said drill steel, pressure fluid actuated feeding means for said motor, and pressure fluid operated means automatically controlled by pressure variations in said drilling motor caused by resistance to drill steel rotation for automatically controlling said feeding means and including a fluid actuated valve having an operative pressure fluid connection with said motor whereby said valve is controlled by the pressure within the drilling motor.

48. A drilling mechanism comprising a drilling motor, a drill steel actuated by said motor, rotation means for said drill steel, reversible power operated feeding means for feeding said motor and steel forwardly and rearwardly, and means for automatically reversing said feeding means including a control member movable into different control-effecting positions and automatically controlled by resistance to drill steel rotation, and means for automatically subjecting said control member to the control of such resistance to drill steel rotation.

49. In a rock drill, a pressure fluid actuated drilling motor of the hammer type, reversible pressure fluid actuated feeding means for said motor, and means for automatically reversing said feeding means comprising a fluid actuated valve device movable into different control-effecting positions and controlled by the pressure in said drilling motor, fluid actuated operating means for said valve device, and means for subjecting said operating means to the pressure in said drilling motor.

50. In a rock drill, a pressure fluid actuated drilling motor of the hammer type, pressure fluid actuated feeding means for said motor, and means for automatically controlling said feeding means comprising a fluid actuated valve device movable into different control-effecting positions and controlled by the pressure in said drilling motor, fluid actuated operating means for said valve device, and means for subjecting said operating means to the pressure in said drilling motor.

51. In a rock drill, a pressure fluid actuated drilling motor of the hammer type, reversible pressure fluid actuated feeding means therefor comprising relatively reciprocable feed cylinder and piston elements and means for supplying pressure fluid to the opposite ends of said feed cylinder element to effect relative reciprocation of said elements in either of opposite directions, and means for automatically stopping the forward feed and effecting operation of the reverse feed when the load on the drilling motor exceeds a predetermined amount including control means controlled automatically by the pressure in the drilling motor caused by load changes in said motor, fluid actuated operating means for said control means, and means for subjecting said operating means to the pressure within said drilling motor.

52. In a drilling mechanism, a pressure fluid actuated drilling motor of the reciprocating piston type, power operated feeding means for said motor, and means for automatically controlling said feeding means including a pressure fluid actuated valve device movable into different control-effecting positions and responsive to predetermined pressure conditions within said drilling motor, fluid actuated operating means for said valve device, and means for subjecting said operating means to the pressure within said drilling motor.

53. In a drilling mechanism, a pressure fluid actuated drilling motor of the hammer piston type, pressure fluid operated feeding means for said motor, and means for automatically controlling said feeding means including a pressure fluid actuated valve device movable into different control-effecting positions and responsive to predetermined pressure conditions within said drilling motor, fluid actuated operating means for said valve device, and means for subjecting said operating means to the pressure within said drilling motor.

54. In a drilling mechanism, a pressure fluid actuated drilling motor, reversible positive power operated feeding means therefor, and means for automatically reversing said feeding means including a pressure fluid actuated valve device movable into different control-effecting positions and responsive to predetermined pressure conditions within said drilling motor, fluid actuated operating means for said valve device, and means for subjecting said operating means to the pressure within said drilling motor.

55. In a drilling mechanism, a pressure fluid actuated drilling motor, reversible power operated feeding means for feeding said motor forwardly and rearwardly, and means for cutting out the operation of said forward feeding means and effecting operation of said reverse feeding means including a pressure fluid actuated valve device movable into different control-effecting positions and automatically responsive to predetermined pressure conditions within said drilling motor, fluid actuated operating means for said valve device, and means for subjecting said operating means to the pressure within said drilling motor.

56. In a drilling mechanism, a pressure fluid actuated drilling motor, reversible pressure fluid actuated feeding means for said drilling motor for positively feeding said motor forwardly and rearwardly, and means automatically controlled by the pressure in said drilling motor for reversing said feeding means and including a plurality of cooperating pressure fluid actuated controlling valves for effecting reversal of said feeding means, and means for controlling said valves by the pressure in said drilling motor.

57. In a drilling mechanism, a pressure fluid actuated drilling motor, reversible pressure fluid actuated feeding means for said motor for positively feeding said motor forwardly and rearwardly, and means for automatically effecting reversal of said feeding means including a pressure fluid actuated controlling valve device automatically controlled by the pressure within said drilling motor for reversing said feeding means, fluid actuated operating means for said valve device, and means for subjecting said operating means to the pressure within said drilling motor.

58. In a drilling mechanism, a pressure fluid actuated drilling motor, reversible pressure actuated feeding means for said motor for positively feeding said motor forwardly and rearwardly, and means automatically controlled by the pressure within said drilling motor for cutting out the operation of one of said feeding means and effecting operation of the other and including a plurality of cooperating pressure fluid actuated controlling valves for controlling fluid flow to said feeding means, and means for controlling said valves by the pressure within said drilling motor.

59. In a drilling mechanism, a pressure fluid actuated drilling motor, reversible pressure fluid actuated feeding means for said motor for positively feeding said motor forwardly and rearwardly, and means automatically controlled by the pressure within said drilling motor for cutting out the operation of said forward feeding means and effecting the operation of said reverse feeding means and including a pressure fluid actuated controlling valve for controlling fluid flow to said feeding means, fluid actuated operating means for said controlling valve, and means for subjecting said operating means to the pressure within said drilling motor.

60. In a drilling mechanism, a pressure fluid actuated drilling motor, reversible pressure fluid actuated feeding means for said motor for positively feeding said motor forwardly and rearwardly, and means automatically controlled by the pressure within said drilling motor for cutting out the operation of said forward feeding means and effecting the operation of said reverse feeding means including a plurality of cooperating fluid actuated controlling valves for controlling fluid flow to said feeding means, and means for controlling said valves by the pressure within said drilling motor.

61. In a drilling mechanism, a pressure fluid actuated drilling motor, reversible pressure fluid actuated feeding means for said motor for positively feeding said motor forwardly and rearwardly, and means automatically controlled by pressure changes within said drilling motor for simultaneously affecting the operation of both said forward and reverse feeds.

62. In a drilling mechanism, a pressure fluid actuated drilling motor, reversible pressure fluid actuated feeding means for said motor for positively feeding said motor forwardly and rearwardly, and means automatically controlled by the pressure within said drilling motor for simultaneously affecting the operation of both said forward and reverse feeds including a plurality of cooperating pressure fluid actuated controlling valves for controlling fluid flow to said feeding means, and means for controlling said valves by the pressure within said drilling motor.

63. In a drilling mechanism, a pressure fluid actuated drilling motor, pressure fluid actuated feeding means for said motor, and means automatically controlled by the pressure within said drilling motor for controlling said feeding means including a plurality of cooperating pressure fluid actuated fluid controlling valves, the operation of one of said valves being dependent on the operation of another, and means for controlling said valves by the pressure within said drilling motor including fluid actuated operating means for one of said valves, and means for subjecting said operating means to the pressure within said drilling motor.

64. In a drilling mechanism, a drilling motor, reversible pressure fluid actuated feeding means for said motor and automatic pressure fluid operated means responsive to variations in pressure within said feeding means for automatically preventing an excessive rate of rearward feed and wholly inoperative during normal forward feed of the drilling motor.

65. In a drilling mechanism, a pressure fluid actuated percussive drilling motor including a hammer piston, a drill steel actuated thereby, rotation means for said drill steel operated by said piston, power operated feeding means for said motor and steel, automatic means controlled by certain predetermined load variations on said motor for automatically controlling said feeding means, and automatic pressure fluid actuated means automatically controlled by the feeding means and responsive only to an excessive rate of feed for automatically retarding said feeding means.

66. In a drilling mechanism, a drifter type drill comprising a drilling motor of the mounted type, a cradle or shell for supporting and guiding said drilling motor, pressure fluid actuated feeding means for said drilling motor, and means responsive to pressure changes within said feeding means and automatically operative only when the rate of feed becomes excessive for automatically retarding said feeding means.

67. In a drilling mechanism, a pressure fluid actuated drilling motor and a drill steel actuated by said motor, rotation means for said drill steel, power operated feeding means for said motor and steel, and means automatically responsive to the resistance to drill steel rotation for automatically controlling said feeding means including pressure fluid operated control means and an operative pressure fluid connection between said motor and said control means whereby the latter is controlled by the pressure in said drilling motor.

68. In a drilling mechanism, work performing means comprising a pressure fluid actuated drilling motor, reversible power operated feeding means for positively feeding said work performing means forwardly and rearwardly, and means automatically responsive to load changes on said drilling motor for controlling said feeding means and including pressure fluid operated control means and an operative pressure fluid connection between said control means and said drilling motor whereby said control means is controlled by the pressure within said drilling motor.

69. In a drilling mechanism, a pressure fluid actuated drilling motor, a drill steel actuated thereby, rotation means for said drill steel, power operated feeding means for said drill steel, and means automatically responsive to the resistance to drill steel rotation for controlling the pressure in said feeding means and including pressure fluid operated control means and an operative pressure fluid connection between said control means and said drilling motor whereby said control means is controlled by the pressure in the drilling motor.

70. In a drilling mechanism, a hammer motor, a drill steel actuated thereby, a rotation means for said drill steel, feeding means for said drill steel for effecting positive feed of the drill steel in either direction, and means responsive to the resistance to drill steel rotation for automatically reversing the feeding means.

In testimony whereof I affix my signature.

THORE R. E. RUNDQVIST.